United States Patent
Roberts et al.

(10) Patent No.: US 9,544,637 B2
(45) Date of Patent: Jan. 10, 2017

(54) CONTEXT-BASED MEDIA PROGRAM PRESENTATION METHODS AND SYSTEMS

(71) Applicant: Verizon Patent and Licensing Inc., Arlington, VA (US)

(72) Inventors: Brian F. Roberts, Dallas, TX (US); George M. Higa, Plano, TX (US); Anthony Lemus, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 21 days.

(21) Appl. No.: 14/675,513

(22) Filed: Mar. 31, 2015

(65) Prior Publication Data
US 2016/0127784 A1  May 5, 2016

Related U.S. Application Data

(60) Provisional application No. 62/072,863, filed on Oct. 30, 2014.

(51) Int. Cl.
*G06F 3/00* (2006.01)
*G06F 13/00* (2006.01)
(Continued)

(52) U.S. Cl.
CPC ........ *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01); *H04N 21/4725* (2013.01); *H04N 21/4755* (2013.01);
(Continued)

(58) Field of Classification Search
CPC  H04N 21/4532; H04N 21/4227; H04N 7/162; H04N 7/173; H04N 7/17318; H04N 21/4126; H04N 21/472; H04N 21/441; H04N 21/4751; H04N 21/8355; H04N 21/25875; H04N 21/44218; H04N 21/4753; H04N 1/00381; H04N 1/00384; H04N 21/6582; H04N 21/25891; H04N 21/42209; H04N 21/4222; H04N 21/4622; H04N 21/482; G09G 2330/026; G09G 2330/027; G09G 2354/00; G09G 2370/022
See application file for complete search history.

(56) References Cited

U.S. PATENT DOCUMENTS

| | | | |
|---|---|---|---|
| 7,966,632 B1 * | 6/2011 | Pan | H04N 5/44543 725/45 |
| 2011/0197214 A1 * | 8/2011 | Burton | H04N 21/44218 725/13 |

* cited by examiner

*Primary Examiner* — Pankaj Kumar
*Assistant Examiner* — Alazar Tilahun

(57) ABSTRACT

An exemplary computer-implemented media service system detects an input command provided by a user to initiate a viewing session by way of a display screen in communication with a media content processing device that operates in accordance with a media service, identifies a context within which the input command is provided by the user, selects, based on the identified context, a media program available by way of the media service and that is potentially of interest to the user, and directs the media content processing device to present the media program by way of the display screen when the viewing session begins in response to the input command. Corresponding systems and methods are also described.

20 Claims, 11 Drawing Sheets

(51) Int. Cl.

| | |
|---|---|
| *H04N 5/455* | (2006.01) |
| *H04N 21/431* | (2011.01) |
| *H04N 21/45* | (2011.01) |
| *H04N 21/466* | (2011.01) |
| *H04N 21/442* | (2011.01) |
| *H04N 21/462* | (2011.01) |
| *H04N 21/4725* | (2011.01) |
| *H04N 21/475* | (2011.01) |
| *H04N 21/482* | (2011.01) |
| *H04N 21/81* | (2011.01) |
| *G06F 3/0482* | (2013.01) |
| *H04N 21/472* | (2011.01) |
| *H04N 21/4788* | (2011.01) |
| *H04N 21/458* | (2011.01) |
| *H04N 21/25* | (2011.01) |
| *H04N 21/258* | (2011.01) |
| *H04N 21/658* | (2011.01) |

(52) U.S. Cl.
CPC .... *H04N 21/4788* (2013.01); *H04N 21/47202* (2013.01); *H04N 21/47205* (2013.01); *H04N 21/4821* (2013.01); *H04N 21/4825* (2013.01); *H04N 21/4826* (2013.01); *H04N 21/6582* (2013.01); *H04N 21/8133* (2013.01)

CONTEXT-BASED MEDIA PROGRAM PRESENTATION METHODS AND SYSTEMS

RELATED APPLICATIONS

The present application claims priority under 35 U.S.C. §119(e) to U.S. Provisional Patent Application No. 62/072,863, filed Oct. 30, 2014. The contents of the provisional patent application are hereby incorporated by reference in their entirety.

BACKGROUND INFORMATION

In order to view a media program available by way of a conventional media content processing device (e.g., a set-top box device), a user may provide an input command to turn on a display screen (e.g., a television) that is communicatively coupled to the media content processing device. In response, the media content processing device may begin presenting whatever media program is currently being carried by a content channel to which the media content processing device is tuned when the input command is provided. This may be problematic if the user does not desire to view and/or is not supposed to view the media program currently being carried by the content channel.

For example, a child may turn on a television that is connected to a set-top box device in the morning with a desire to watch cartoons. However, the night before, the child's parent may have left the set-top box device tuned to a content channel that carries adult programming. This may result in the child being exposed to the adult programming when the television turns on.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
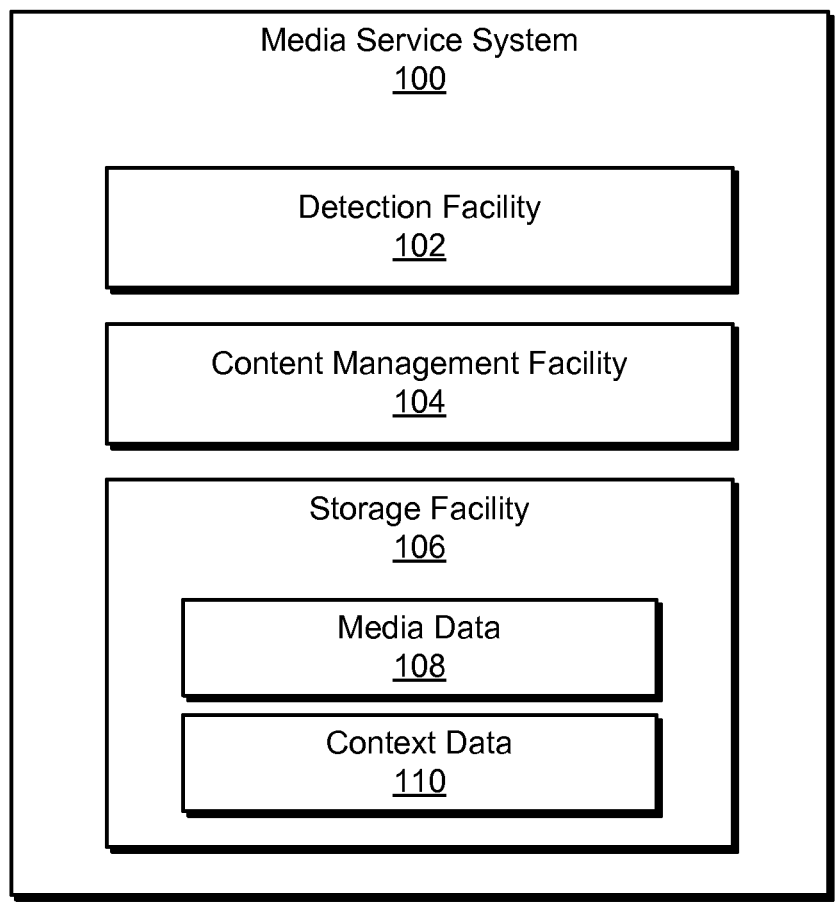
FIG. 1 illustrates an exemplary media service system according to principles described herein.

Context-based media program presentation methods and systems are described herein. As will be described below, an exemplary computer-implemented media service system may detect an input command provided by a user to initiate a viewing session by way of a display screen in communication with a media content processing device that operates in accordance with a media service. The media service system may identify a context within which the input command is provided by the user and select, based on the identified context, a media program available by way of the media service and that is potentially of interest to the user. The media service system may then direct the media content processing device to present the media program by way of the display screen when the viewing session begins in response to the input command.

To illustrate, a child may have a desire to watch cartoons on a Saturday morning. To this end, the child may press a power button on a remote control device associated with a television that is connected to a set-top box device in order to turn the television on. The media service system described herein may detect the pressing of the power button and, in response, identify a context within which the power button is pressed.

As used herein, a "context" may refer to a temporal context and/or a user context within which an input command is provided by a user to initiate a viewing session by way of a display screen in communication with a media content processing device that operates in accordance with a media service. A "temporal context" is representative of temporal information associated with when the input command is provided by the user. For example, a temporal context may indicate a time of day that the input command is provided by the user, a week day (e.g., Sunday, Monday, Tuesday, etc.) during which the input command is provided by the user, and/or a calendar date (e.g., March 25, April 6, etc.) during which the input command is provided by the user. A "user context" is representative of information associated with one or more users that utilize a media content processing device in order to access media content. For example, a user context may indicate an identity of the user that provides the input command and/or a user present within a vicinity of the display screen when the input command is provided. A user context may additionally or alternatively indicate a user account that is currently logged in to the media content processing device and/or the media service when the input command is provided by the user.

Returning to the example in which the child has a desire to watch cartoons, the media service system may identify a temporal context within which the power button is pressed by detecting a timestamp that corresponds to when the power button is pressed. The timestamp may indicate that the child pressed the power button at 7:30 am on a Saturday morning. Based on this temporal information, the media service system may determine that the set-top box device historically presents cartoons on Saturday mornings and accordingly select a media program available by way of the media service that is related to the cartoons that are historically presented. In this example, the selected media program may include a cartoon being carried by a particular content channel. The media service system may direct the set-top box device to tune to the particular content channel and begin presenting the selected cartoon when the television turns on. Additional examples of the methods and systems described herein will be provided below.

The methods and systems described herein may facilitate presentation of a media program that is likely of interest to a user when a viewing session is initiated (e.g., when a display screen associated with a media content processing device turns on), regardless of what the media content processing device was presenting prior to the initiation of the viewing session. This may allow for discovery by users of new media content, minimize missed viewing opportunities (e.g., by minimizing the time it takes for users to find media content in which they are interested), prevent inadvertent exposure of undesirable or inappropriate media programs to minors and other users with special viewing needs, and/or otherwise benefit users and media content providers in ways that will be made apparent herein.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features and/or tools configured to facilitate user discovery, access, and/or consumption of media content (e.g., subscription television content and/or media-on-demand content). For example, system 100 may provide one or more features of a subscription television service through which end users of the service have access to various media programs. System 100 may be associated with (e.g., operated by) a provider of the media service ("service provider") and/or any other entity as may serve a particular implementation.

As shown, system 100 may include, without limitation, a detection facility 102, a content management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store detection data generated and/or used by detection facility 102 and/or content management facility 104. For example, storage facility 106 may store media data 108 representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the media service. Such media programs that are made available for user consumption through a media service may be accessed and/or played back by an appropriately configured media player device for presentation to a user.

Media data 108 may represent actual content of media content and/or information about the media content. For example, media data 108 may include metadata (e.g., information about genre, cast, title, playback duration, release date, chaptering information, etc.) and/or enriched metadata (e.g., user-defined tags, ratings, etc.) for the media content.

Storage facility 106 may additionally or alternatively store context data 110 representative of or otherwise associated with various types of contexts that may be identified in accordance with the methods and systems described herein. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by detection facility 102 and/or content management facility 104. In certain examples, data generated by detection facility 102 and/or content management facility 104 may be stored permanently or temporarily to storage facility 106.

Detection facility 102 may detect an input command provided by a user to initiate a viewing session by way of a display screen in communication with a media content processing device that operates in accordance with a media service. For example, detection facility 102 may detect an input command provided by a user to turn the display screen on (e.g., by powering on, waking up from a sleep or standby state, or otherwise entering an "on" state in which the display screen is powered on and ready to display content provided by the media content processing device).

The input command to initiate the viewing session may additionally or alternatively include a command for the media content processing device itself to turn on. For example, in some scenarios, a display screen in communication with a media content processing device may be in an on state, but the media content processing device itself may be in an off state (e.g., powered down or otherwise not ready to present content). In this scenario, the user may initiate the viewing session by providing an input command for the media content processing device itself to turn on.

The input command to initiate the viewing session may additionally or alternatively include a command to log in to the media service. For example, the media service may include an Internet streaming video service. In this scenario, a user may initiate a viewing session by logging in to the Internet streaming video service.

The input command to initiate the viewing session may additionally or alternatively include a command for the media content processing device to begin executing an application associated with the media service. For example, the input command may include a command for the media content processing device to begin executing a mobile application that facilitates user access to the media service. Other types of input commands may be detected by detection facility 102 as may serve a particular implementation.

The input command to initiate the viewing session may be provided by the user in any suitable manner. For example, the input command may be provided by the user selecting a button on a remote control device associated with the display screen and/or the media content processing device. The input command may additionally or alternatively be provided by the user selecting a button disposed on the display screen and/or the media content processing device, providing a voice command, and/or in any other manner as may serve a particular implementation.

Content management facility 104 may perform various content management operations. For example, in response to detection facility 102 detecting an input command to initiate a viewing session by way of a display screen in communication with a media content processing device that operates in accordance with a media service, content management facility 104 may identify a context within which the input command is provided by the user. Content management facility 104 may select, based on the identified context, a media program available by way of the media service and that is potentially of interest to the user. Content management facility 104 may then direct the media content processing device to present the media program by way of the display screen when the viewing session begins in response to the input command (e.g., when the display screen turns on in response to the input command). Each of these operations will be described in more detail below.

Figure 2:
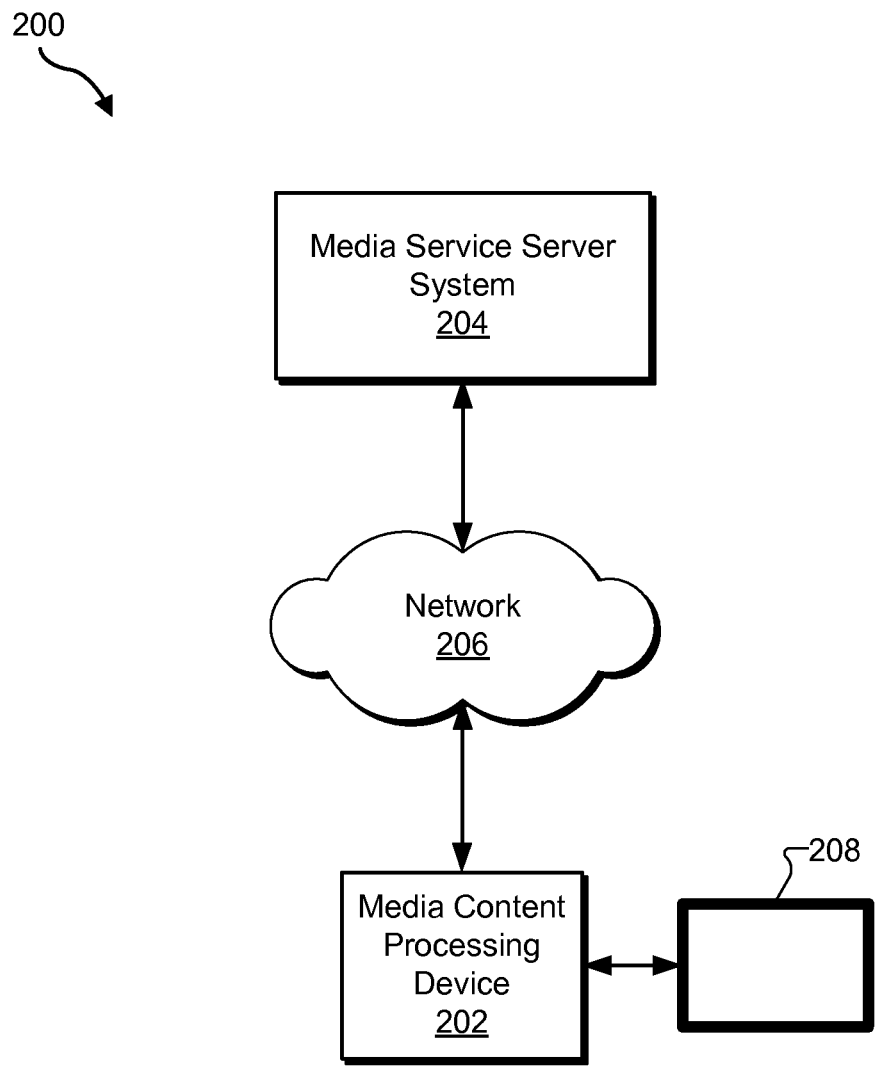
FIG. 2 shows an exemplary implementation of the system of FIG. 1 according to principles described herein.

FIG. 2 shows an exemplary implementation 200 of system 100. As shown, implementation 200 may include a media content processing device 202 in communication with a media service server system 204 ("server system 204"), which may include one or more computing devices (e.g., server devices remotely located from media content processing device 202) by way of a network 206. Implementation 200 may also include a display screen 208 in communication with media content processing device 202.

In implementation 200, one or more of facilities 102-106 of system 100 may be implemented entirely by media content processing device 202, entirely by server system 204, or distributed across media content processing device 202, server system 204 and/or display screen 208 in any manner. System 100 may alternatively be at least partially implemented by one or more computing devices or systems separate from media content processing device 202 and server system 204. For example, system 100 may be at least partially implemented by a computing system maintained by a third-party entity other than a media service provider associated with server system 204.

Media content processing device 202 and server system 204 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, media content processing device 202 and server system 204 may communicate via network 206. Network 206 may include one or more networks, such as one or more wireless networks (e.g., Wi-Fi networks), wireless communication networks, mobile telephone networks (e.g., cellular telephone networks), closed media networks, open media networks, wide area networks (e.g., the Internet), subscriber television networks, local area networks, and any other networks capable of carrying data (e.g., streaming and/or downloading media programs) and/or communications signals between media content processing device 202 and server system 204. Communications between media content processing device 202 and server system 204 may be transported using any one of the above-listed networks, or any combination or sub-combination of the above-listed networks. Alternatively, media content processing device 202 and server system 204 may communicate in another way such as by direct connections between media content processing device 202 and server system 204.

Server system 204 may be configured to distribute media programs to media content processing device 202 for access and use by media content processing device 202 to present media programs for consumption by users. Server system 204 may distribute media programs to media content processing device 202 as part of the media service provided by system 100 and using any suitable media streaming and/or downloading technologies (e.g., Internet media streaming and/or downloading technologies). The media service may include a subscription television service, an online media streaming service such as an Internet streaming video service, and/or any other type of media service as may serve a particular implementation.

Media content processing device 202 may include one or more user computing devices associated with a user. Examples of such devices include, without limitation, a media player computing device, a display device, a set-top box device, a digital video recording ("DVR") device, a computer, a tablet computer, a smart phone device, and any other device capable of accessing the media service and/or media programs provided by system 100.

Media content processing device 202 may be configured for use by a user associated with (e.g., operating) the media content processing device 202 to access a media service. For example, the user may utilize the media content processing device 202 to access one or more user interfaces provided by server system 204 and/or media content processing device 202 as part of the media service, and to present the user interfaces for use by the user to discover, access, and/or consume media programs and/or discrete installments of media programs distributed by server system 204 as part of the media service.

In some examples, media content processing device 202 may present media programs and one or more interfaces associated with a media service by way of display screen 208. Display screen 208 may include a television, display monitor, and/or any other device separate from media content processing device 202, as shown in FIG. 2. Alternatively, display screen 208 may be integrated into media content processing device 202. For example, display screen 208 may include a display screen integrated into a tablet computer or smart phone device.

Various manners in which system 100 may identify a context within which an input command is provided by a user to initiate a viewing session by way of a display screen (e.g., display screen 208) in communication with a media content processing device (e.g., media content processing device 202) that operates in accordance with a media service, select, based on the identified context, a media program available by way of the media service and that is potentially of interest to the user, and direct the media content processing device to present the media program by way of the display screen when the viewing session begins in response to the input command will now be described.

In some examples, system 100 may identify the context within which the input command is provided by the user by identifying a temporal context within which the input command is provided by the user. For example, system 100 may detect a timestamp that corresponds to when the input command is provided by the user. The timestamp may indicate a time of day that the input command is provided by the user, a week day during which the input command is provided by the user, a calendar date during which the input command is provided by the user, and/or any other type of temporal information associated with the input command as may serve a particular implementation.

System 100 may use the identified temporal context to select a media program that is available by way of the media service (i.e., that is available for presentation when the viewing session begins) and that is potentially of interest to the user. For example, system 100 may use the temporal context to identify one or more media programs that the media content processing device historically presents by way of the display device during the same time of day, on the same week day, and/or on the same calendar date as that indicated in the timestamp. System 100 may then identify a particular media program that is available by way of the media service and that is related to the one or more media programs (e.g., by identifying a media program that has one or more attributes (e.g., metadata values) that are the same as or related to one or more attributes of the one or more media programs) and designate the particular media program as being potentially of interest to the user. System 100 may then direct the media content processing device to present the particular media program by way of the display screen when the viewing session begins in response to the input command.

To illustrate, a user may consistently watch news programs each Tuesday between 6:00 pm and 7:00 pm. On one particular Tuesday evening, the user may provide an input command to turn his or her television on at 6:15 pm. System 100 may detect a timestamp corresponding to when the input command is provided and use the temporal context information represented by the timestamp to analyze a viewing log maintained or otherwise accessed by system 100. The viewing log may include a log of each television program that is presented by way of the display screen over the course of a pre-determined period of time. By accessing this log, system 100 may identify the various news programs that the user typically watches at 6:15 pm on Tuesdays and identify a particular news program that is currently available by way of media service and that is related to the identified news programs. System 100 may designate the particular news program as being potentially of interest to the user and direct the media content processing device to automatically present the particular news program by way of the television when the viewing session begins.

System 100 may additionally or alternatively identify the context within which the input command is provided by the user by identifying a user context within which the input command is provided by the user. In some examples, the user context indicates an identity of the user. The identity of the user may be determined by system 100 in any suitable manner.

For example, system 100 may detect that a mobile device is located within the vicinity of the media content processing device and/or display screen when the input command is provided by the user, identify a user profile associated with the mobile device, and use the user profile to determine the identity of the user.

Figure 3:
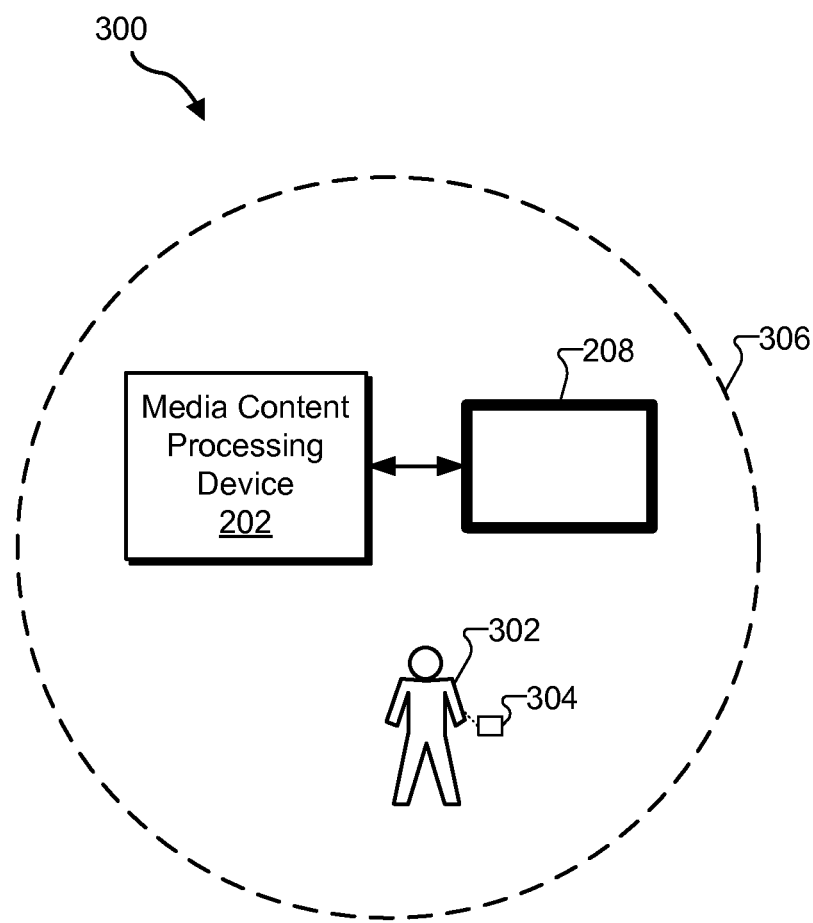
FIG. 3 illustrates an exemplary scenario in which a user carries a mobile device into a vicinity of a media content processing device and a display screen according to principles described herein.

To illustrate, FIG. 3 illustrates an exemplary scenario 300 in which a user 302 carries a mobile device 304 into a vicinity 306 of media content processing device 202 and display screen 208. Mobile device 304 may include a tablet computer, a mobile phone, and/or any other mobile computing device as may serve a particular implementation. Vicinity 306 may include a geographic area, a network footprint (e.g., a vicinity defined by a range of a wireless router), and/or any other suitable area as may serve a particular implementation. As such, system 100 may detect that mobile device 304 is within vicinity 306 in any suitable manner. For example, system 100 may use global positioning system ("GPS") data to determine that mobile device 304 is located within a geographic vicinity of media content processing device 202 and/or display screen 208. As another example, system 100 may determine that mobile device 304 is located within vicinity 306 by determining that mobile device 304 is connected to the same local area network as media content processing device 202 and/or display screen 208.

In response to determining that mobile device 304 is within vicinity 306, system 100 may identify a user profile associated with mobile device 304. This may be done in any suitable manner. For example, system 100 may detect an identifier of mobile device 304 and query a database of mobile device records (e.g., records maintained by a wireless service provider) for the identifier in order to identify a user profile associated with mobile device 304. The user profile may then be used to determine the identity of user 302 (e.g., by accessing the same mobile device records).

System 100 may additionally or alternatively determine the identity of the user by determining that the input command to initiate the viewing session is provided by way of a mobile device, identifying a user profile associated with the mobile device, and using the user profile to determine the identity of the user.

To illustrate, a user may use a remote control application on his or her mobile phone to provide an input command to turn on a display screen communicatively coupled to a media content processing device. System 100 may detect that the remote control application is being used to provide the input command, and, in response, identify a user profile associated with the mobile device. For example, system 100 may identify a user account logged in to the remote control application and/or into any other application being executed by the mobile phone. The user account may then be used to determine the identity of the user.

As another example, system 100 may determine the identity of the user by acquiring biometric data associated with the user and using the biometric data to determine the identity of the user. For example, system 100 may use one or more sensors, cameras, and/or other devices to acquire facial recognition data, fingerprint data, voice recognition data, and/or any other type of biometric data associated with the user. The acquired biometric data may be used in any suitable way to determine the identity of the user.

In some examples, system 100 may determine the identity of the user by determining one or more characteristics of the user without necessarily identifying who the actual user is. For example, system 100 may determine an identity of a user by determining, in any of the ways described herein, that the user is a certain gender, age, height, etc. and use these characteristics as the identity of the user.

The user context may additionally or alternatively indicate a user account that is currently logged in to the media content processing device and/or the media service when the input command is provided by the user to initiate the viewing session. For example, when an input command to initiate a viewing session is detected, system 100 may determine that a particular user account is logged in to the media service by way of the media content processing device. System 100 may use the user account to identify the user context.

System 100 may use the user context to select a media program available by way of the media service and that is potentially of interest to the user in any suitable manner. For example, in scenarios in which the user context indicates an identity of the user who provided the input command to initiate the viewing system 100 may use the identity of the user to identify a user profile linked to the user and associated with the media content processing device and/or the media service, identify a particular media program available by way of the media service and that has one or more attributes that the user profile indicates are of interest to the user, and designate the particular media program as the media program that is selected as being potentially of interest to the user.

To illustrate, a user may provide an input command to initiate a viewing session, as described herein. In response, system 100 may determine an identity of the user and use the determined identity to identify a user profile linked to the user. The user profile may indicate that the user is an adult male who typically watches sports. System 100 may accordingly determine that a media program entitled "SPORTS-CENTER" is currently available by way of the media service and select this media program for presentation to the user when the viewing session begins.

System 100 may direct the media content processing device to present the selected media program by way of the display screen when the viewing session begins in response to the input command in any suitable manner. As used herein, the viewing session may "begin" when the display screen turns on or otherwise enters an on state in which it is able to display content provided by the media content processing device, when an application associated with the media service begins, when the user logs in to the media service, and/or when any other event occurs in response to the input command to initiate the viewing session being provided.

In some examples, system 100 may direct the media content processing device to present the media program by directing the media content processing device to tune to a content channel carrying the media program. In some examples, the media content processing device may be initially tuned to a different content channel when the input command is provided by the user to initiate the viewing session.

Figure 4:
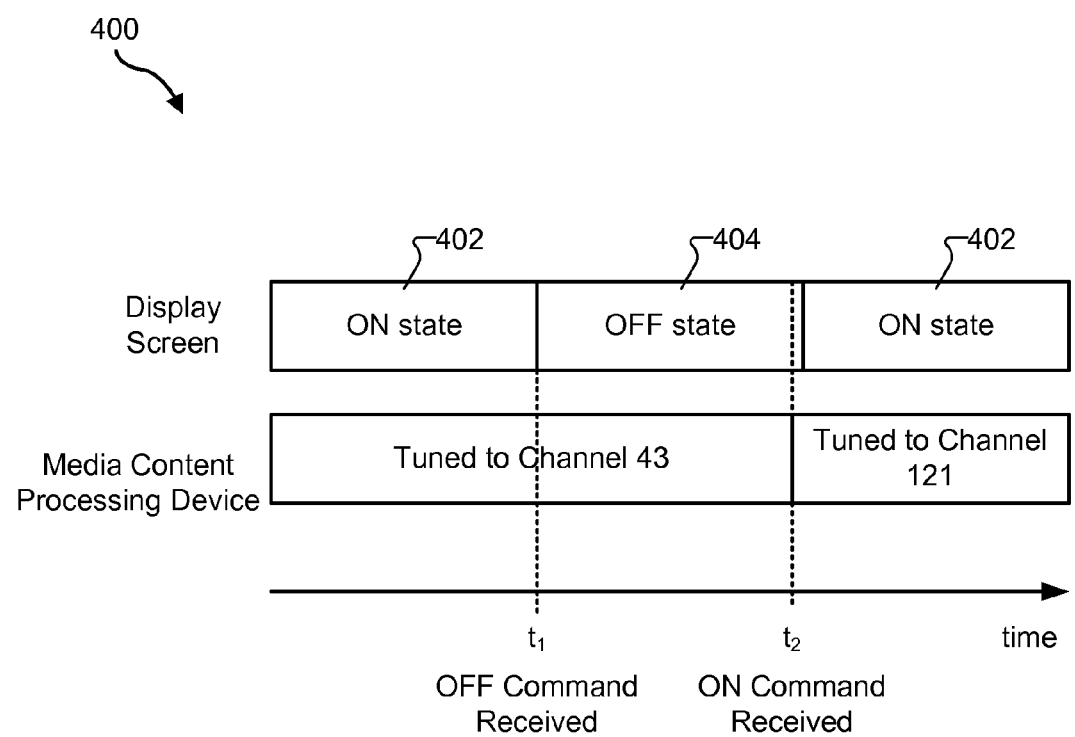
FIG. 4 shows an exemplary timing diagram that shows various states in which a display screen and a media content processing device may be when various input commands are detected by the system of FIG. 1 according to principles described herein.

To illustrate, FIG. 4 shows an exemplary timing diagram that shows various states in which the display screen and media content processing device may be when various input commands are detected by system 100. As shown, the display screen may initially be in an on state 402 while media content processing device is tuned to a content channel labeled "Channel 43". In this state, the media content processing device presents, by way of the display screen, one or more media programs being carried by the content channel labeled "Channel 43".

As shown, at time $t_1$ the user provides an "OFF" command (i.e., a command to turn the display screen off). In response, the display screen enters an off state 404 (i.e., a state in which it does not display content provided by media content processing device). As shown, the media content processing device remains on and tuned to the content channel labeled "Channel 43" while the display screen is in the off state 404.

At time $t_2$, the user provides an "ON" command (i.e., a command to turn the display screen back on). In response, the display screen enters the on state 402 again. As shown, there may be a slight delay between when then "ON" command is received and when the display screen actually enters the "ON" state. This delay may take into account the time it takes for the display screen to power on or otherwise enter the on state 402.

In response to the "ON" command at time $t_2$, system 100 may select, in any of the ways described herein, a media program for presentation to the user when the display screen enters the on state 402. In this example, the selected media program is being carried on a content channel labeled "Channel 121". Hence, system 100 may direct the media content processing device to switch from being tuned to the content channel labeled "Channel 43" to being tuned to the content channel labeled "Channel 121". In this manner, the media content processing device may be tuned to the content channel labeled "Channel 121" and thereby present the selected media program to the user when the display screen enters the on state 402.

System 100 may direct the media content processing device to present the selected media program in any other way (e.g., in ways other than directing the media content processing device to tune to a content channel carrying the selected media program). For example, system 100 may direct the media content processing device to present the selected media program by playing back a media program that had been previously recorded by the media content processing device and/or by presenting an on-demand media program.

System 100 may additionally or alternatively direct the media content processing device to begin presenting a different media program even after the viewing session has begun. For example, system 100 may detect, while the media content processing device is presenting a first media program selected for a first user by way of the display screen, that a second user enters a vicinity of the display screen. In response, system 100 may select a second media program available by way of the media service and that is potentially of interest to the second user. System 100 may then direct the media content processing device to switch from presenting the first media program by way of the display screen to presenting the second media program by way of the display screen.

In some examples, this may be performed automatically by system 100 without input by either user. For example, system 100 may detect that the first user has left the vicinity of the display screen prior to the second user entering the vicinity of the display screen. In this scenario, system 100 may automatically, without receiving input from the second user, direct the media content processing device to switch from presenting the first media program by way of the display screen to presenting the second media program by way of the display screen.

Alternatively, system 100 may provide a notification of an availability of the second media program prior to directing the media content processing device to switch to presenting the second media program. For example, system 100 may provide, in response to the selection of the second media program and prior to directing the media content processing device to switch from presenting the first media program to presenting the second media program, a notification of an availability of the second media program together with a selectable option that may be selected by one of the users in order to view the second media program.

Figure 5:
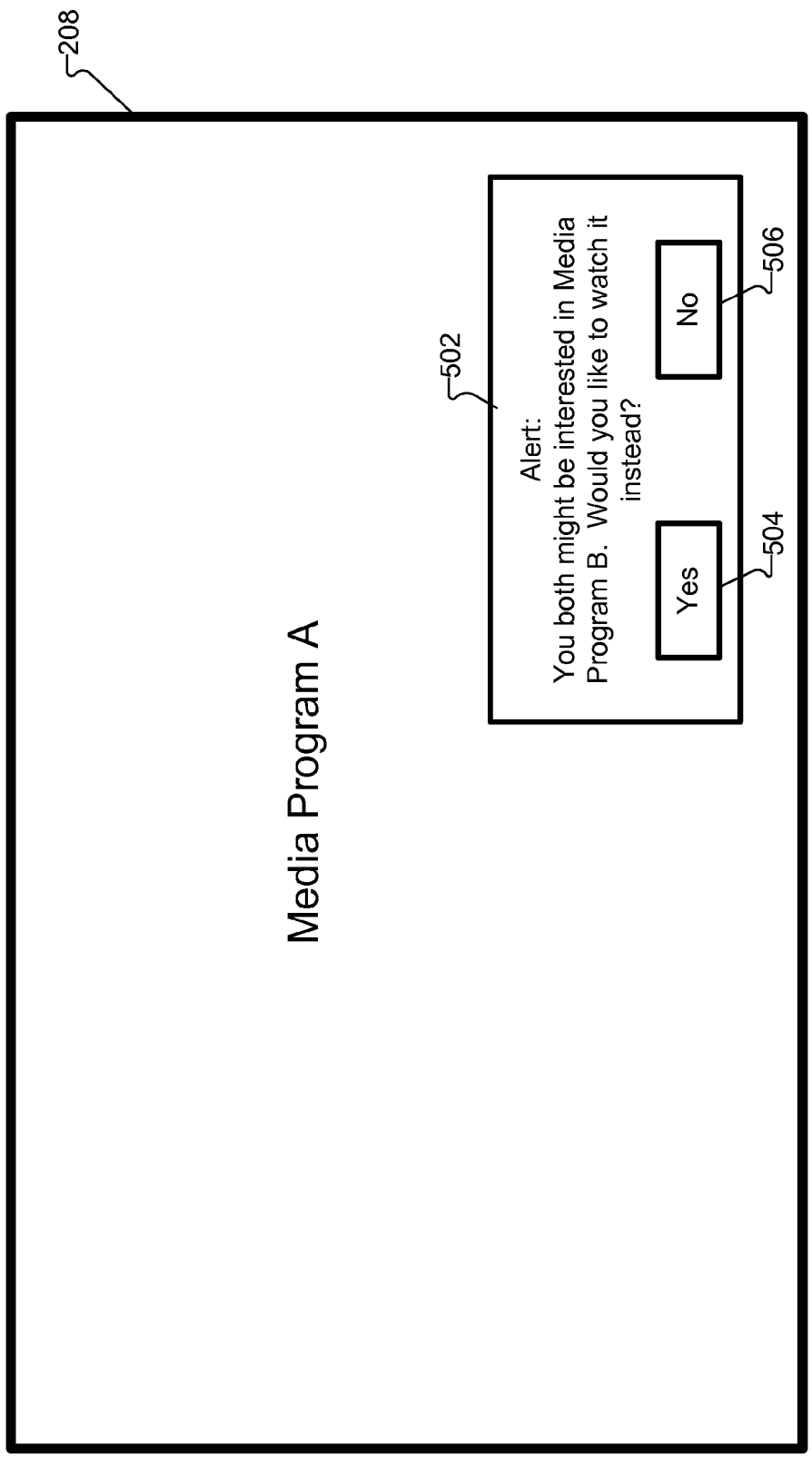
FIG. 5 shows an exemplary notification that may be presented within a display screen according to principles described herein.

To illustrate, FIG. 5 shows that a first media program entitled "Media Program A" is being presented within display screen 208. While this media program is being presented, a second user enters the vicinity of display screen 208 in order to watch media content together with a first user already in the vicinity of display screen 208. In response, system 100 selects a second media program entitled "Media Program B" that is potentially of interest to both the first and second users and provides a notification 502 for display within display screen 208. As shown, notification 502 may be displayed concurrently with the media program entitled "Media Program A" and may include a first selectable option 504 and a second selectable option 506. In response to a user selection of option 504, system 100 may direct the media content processing device to switch from presenting the first media program to presenting the second media program. In response to a user selection of option 506, system 100 may abstain from directing the media content processing device to switch to presenting the second media program. It will be recognized that notification 502 may additionally or alternatively be presented by way of any other computing device (e.g., by way of a mobile device being used by the first and/or second user).

In some examples, system 100 may direct the media content processing device to present, by way of the display screen and concurrently with a media program (e.g., a media program that is initially presented to a user when a viewing session begins), a set of selectable graphical objects representative of a set of features associated with the media service. The set of graphical objects may be collectively referred to as a "quick tray" and may be presented in response to the input command to initiate the viewing session, in response to a user input command to view the quick tray, in response to a presentation of a media program coming to an end (e.g., while closing credits for the media program are being presented), and/or at any other time as may serve a particular implementation.

Figure 6:
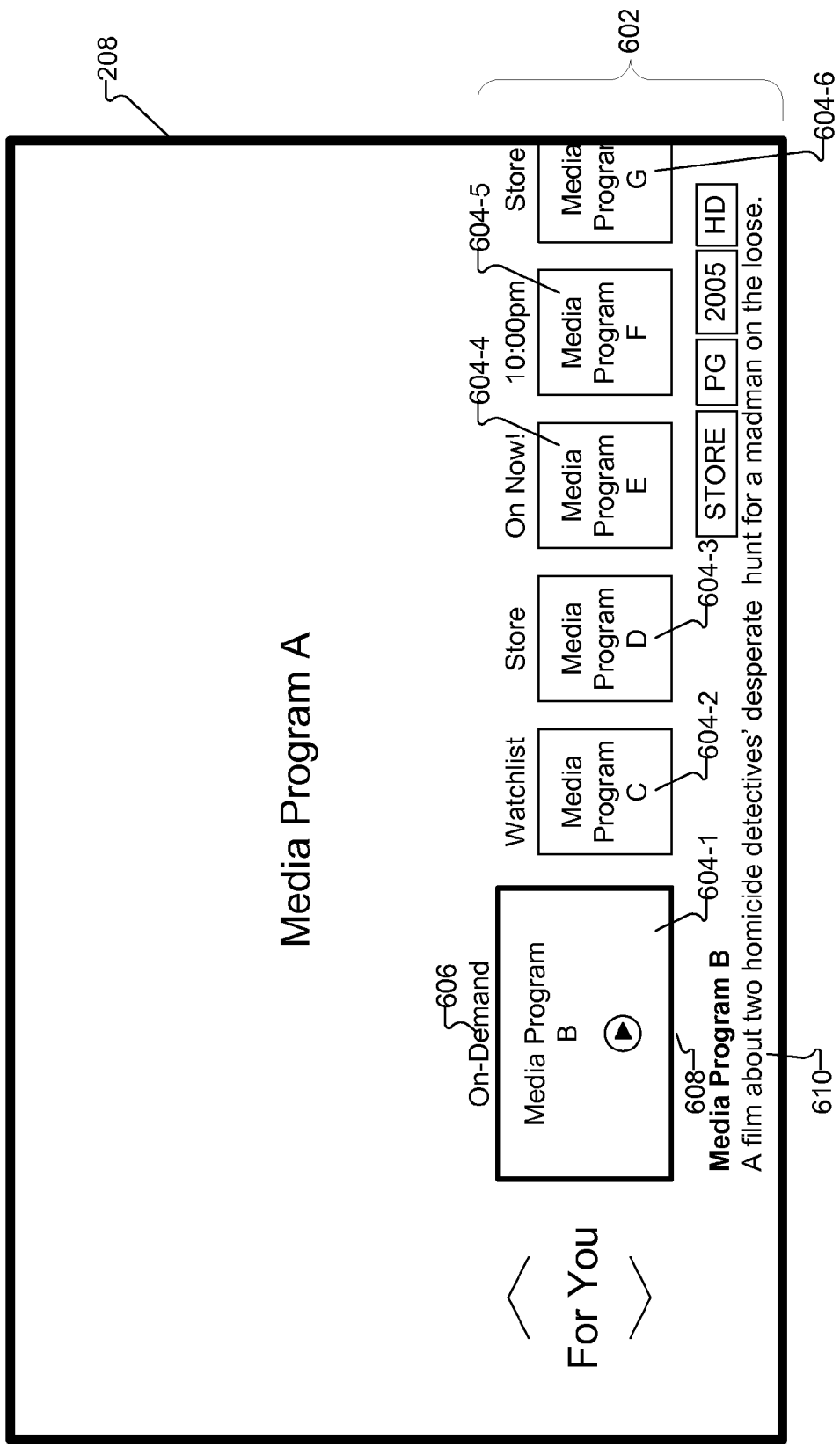
FIGS. 6-8 show various views of an exemplary quick tray that may be presented concurrently with a presentation of a media program within a display screen according to principles described herein.

FIG. 6 shows an exemplary quick tray 602 representative of a set of features associated with the media service that may be presented concurrently with a presentation of a media program entitled "Media Program A" within display screen 208. As shown, quick tray 602 may be presented in a way that allows the media program entitled "Media Program A" to be presented in the background of display screen 208. In this manner, the user may access the contents of quick tray 602 while still viewing the media program.

In the particular example of FIG. 6, quick tray 602 includes a set of graphical objects 604 (e.g., graphical objects 604-1 through 604-6) each representative of a recommended media program included in a set of recommended media programs. Each graphical object 604 may include any suitable graphic (e.g., cover art, a poster, a thumbnail image, a content rating, etc.) that represents a particular recommended media program. Each graphical object 604 may also be labeled by a badge (e.g., badge 606) that indicates a source of the recommended media program represented by the graphical object 604. In some examples, a graphical object 604 may be selected by a user in order to access (e.g., present, view information associated with, modify settings associated with, etc.) a recommended media program represented by the graphical object 604.

In some examples, a user may scroll through the graphical objects 604 (e.g., by selecting left and right directional buttons on a remote control associated with the media content processing device). As shown, a user may scroll a particular graphical object (e.g., graphical object 604-1) into an accentuated position 608 in order to access additional information (e.g., information 610) associated with the recommended media program represented by the graphical object. As shown, information 610 may be concurrently presented with the media program entitled "Media Program A" and quick tray 602.

Each recommended media program represented by graphical objects 604 may be identified for inclusion in the set of recommended media programs in any suitable manner. For example, prior to graphical objects 604 being presented, system 100 may identify the recommended media programs based on a context within which the graphical objects 604 are to be presented.

To illustrate, if graphical objects 604 are to be presented when the viewing session begins, system 100 may identify the recommended media programs based on the same context that is used to select the media program that is presented when the viewing session begins. For example, an adult male may initiate a viewing session on a Saturday afternoon in September. Based on a temporal context and/or a user context associated with when the viewing session is initiated, system 100 may select a college football game for presentation to the user when the viewing session begins. System 100 may use the same temporal and/or user context to select one or more other college football games that are currently available for presentation for inclusion in the set of recommended media programs that are represented by graphical objects 604. In this manner, the user may be automatically presented with a variety of different college football games that he may potentially be interested in viewing.

As another example, if graphical objects 604 are to be presented at a point in time subsequent to the commencement of the viewing session, system 100 may identify the recommended media programs based on a temporal and/or user context associated with the point in time at which graphical objects 604 are to be presented. For example, if graphical objects 604 are to be presented in response to a presentation of a media program coming to an end, system 100 may identify the recommended media programs based on a time at which the media program is scheduled to end.

In some examples, the recommended media programs represented by graphical objects 604 may be related to the media program currently being presented within display screen 208. For example, in the example shown in FIG. 6, the recommended media programs represented by graphical objects 604 may be related to the media program entitled "Media Program A". The recommended media programs may be related to the media program currently being presented within display screen 208 in any suitable manner. For example, the recommended media programs may have one or more attributes (e.g., metadata values) that are the same as one or more attributes of the media program currently being presented within display screen 208. To illustrate, the media program entitled "Media Program A" may have a metadata value that identifies it as being a comedy. In this example, the media programs represented by graphical objects 604 may also have metadata values identifying them as being comedies.

In some examples, system 100 may determine a relative position of each graphical object 604 included in the set of graphical objects 604 based on a degree of relatedness of each recommended media program included in the set of recommended media programs to the media program being presented within display screen 208. For example, as shown in FIG. 6, each graphical object 604 may be arranged in a horizontal row. The closer to the left a particular graphical object is, the more related its associated recommended media program may be to the media program being presented within display screen 208. Hence, in the example of FIG. 6, the media program represented by graphical object 604-1 is relatively more related to the media program entitled "Media Program A" than is the media program represented by graphical object 604-2. It will be recognized that graphical objects 604 may be alternatively arranged in any suitable manner.

In some examples, the recommended media programs represented by graphical objects 604 may be of different types and provided by different sources within the media service. For example, the recommended media programs may include an on-demand media program provided by an on-demand library of media content maintained by the media service, a media program included in a watchlist maintained by the media service (as used herein, a "watchlist" refers to a self-organizing list of everything the user watches or intends to watch, agnostic of delivery method), a media program available for rent or purchase from an online store maintained by the media service, a media program carried by way of a content channel provided by the media service, and/or any other type of media program provided by any type of source within the media service.

In some examples, system 100 may determine a relative position of each graphical object 604 included in the set of graphical objects 604 based on a type and/or source of each recommended media program included in the set of recommended media programs. For example, a particular recommended media program included in the set of recommended media programs may be representative of a rented media program. System 100 may determine that a rental period for the rented media program is within a predetermined amount of time of expiring, and, in response, direct the media content processing device to position a graphical object representative of the rented media program in front of (e.g., to the left of) the remaining graphical objects included in the set of graphical objects 604.

In some examples, quick tray 602 may include different views that each include different features associated with the media service. The user may switch between the different views in any suitable manner (e.g., by using up and down directional buttons included in a remote control device associated with the media content processing device).

Figure 7:
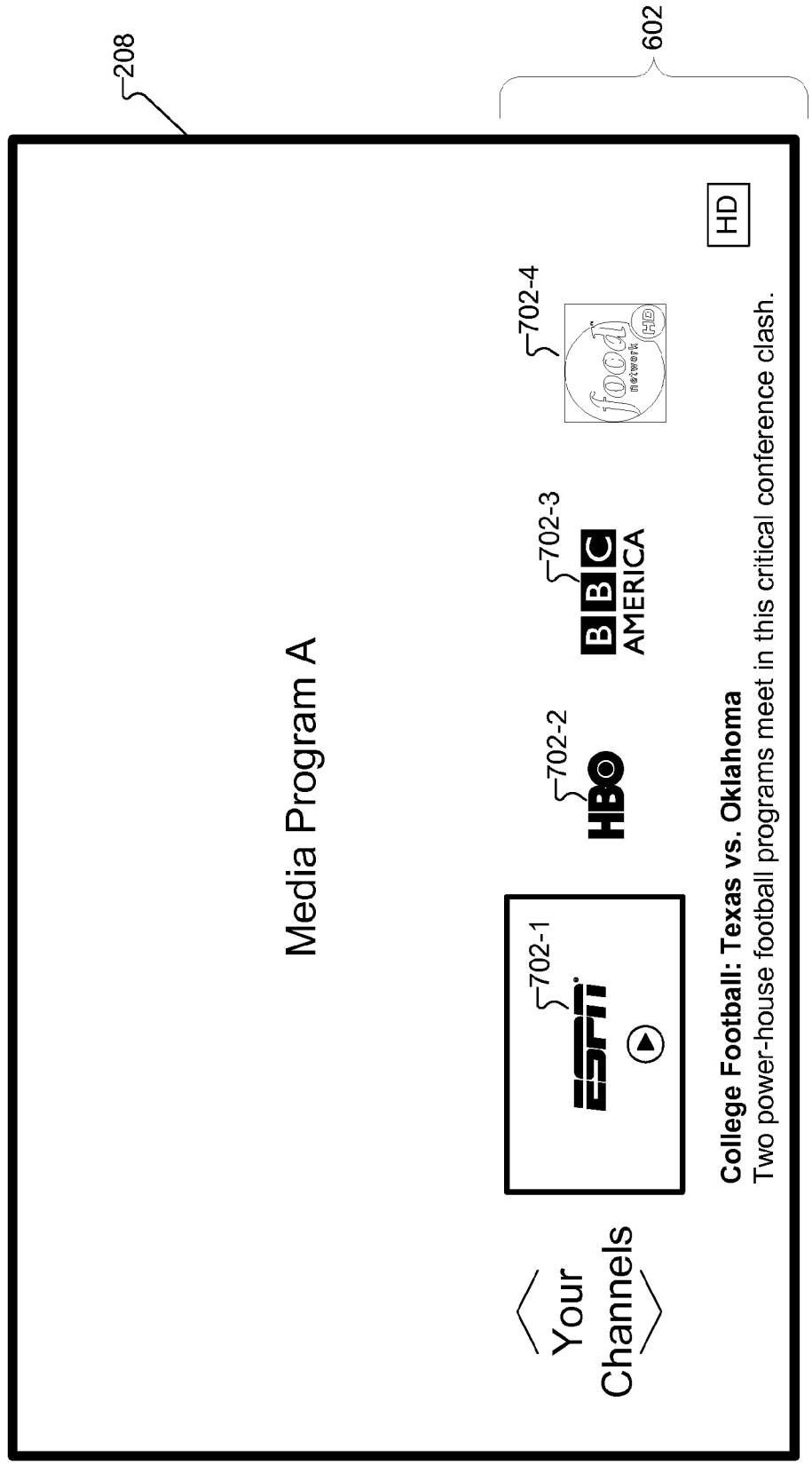

To illustrate, FIG. 7 shows another view of quick tray 602 that may be presented within display screen 208 concurrently with the media program entitled "Media Program A". As shown, this view of quick tray 602 may include a plurality of graphical objects 702 (e.g., graphical objects 702-1 through 702-4) each representative of a particular content channel available by way of the media service and personalized to the user. In this manner, the user may easily select content channels that the user is likely interested in without having to locate the channels within a program guide.

The content channels represented by graphical objects 702 may be personalized to the user in any suitable manner. For example, system 100 may select the content channels for representation by graphical objects 702 based on a temporal and/or user context associated with when graphical objects 702 are to be presented. Additionally or alternatively, system 100 may select the content channels for representation by graphical objects 702 based on a viewing history of the user and/or any other factor as may serve a particular implementation.

Figure 8:
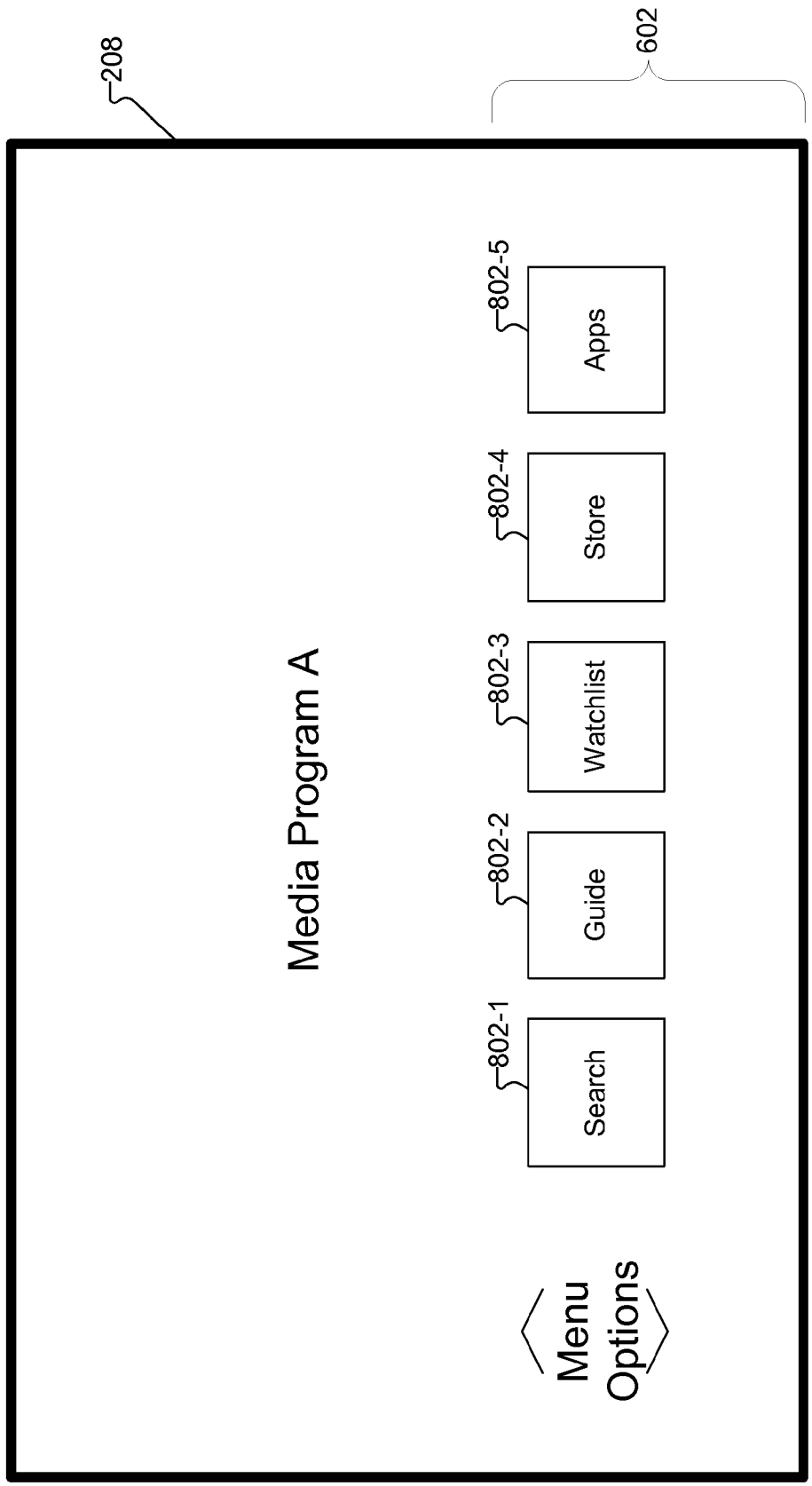

FIG. 8 shows another view of quick tray 602 that may be presented within display screen 208 concurrently with the media program entitled "Media Program A". As shown, this view of quick tray 602 may include a plurality of graphical objects 802 (e.g., graphical objects 802-1 through 802-5) each representative of a particular menu option associated with the media service. The user may select the graphical objects 802 in order to access any of the menu options represented by graphical objects 802 without having to navigate away from the presentation of the media program entitled "Media Program A".

Other views of quick tray 602 may include graphical objects representative of help contents and/or other features associated with the media service as may serve a particular implementation.

In some examples, quick tray 602 may disappear from display screen 208 after a predetermined period of inactivity by the user with respect to quick tray 602. For example, if a user does not interact with quick tray 602 for a period of seven seconds (or any other amount of time), quick tray 602 may disappear from display screen 208.

Figure 9:
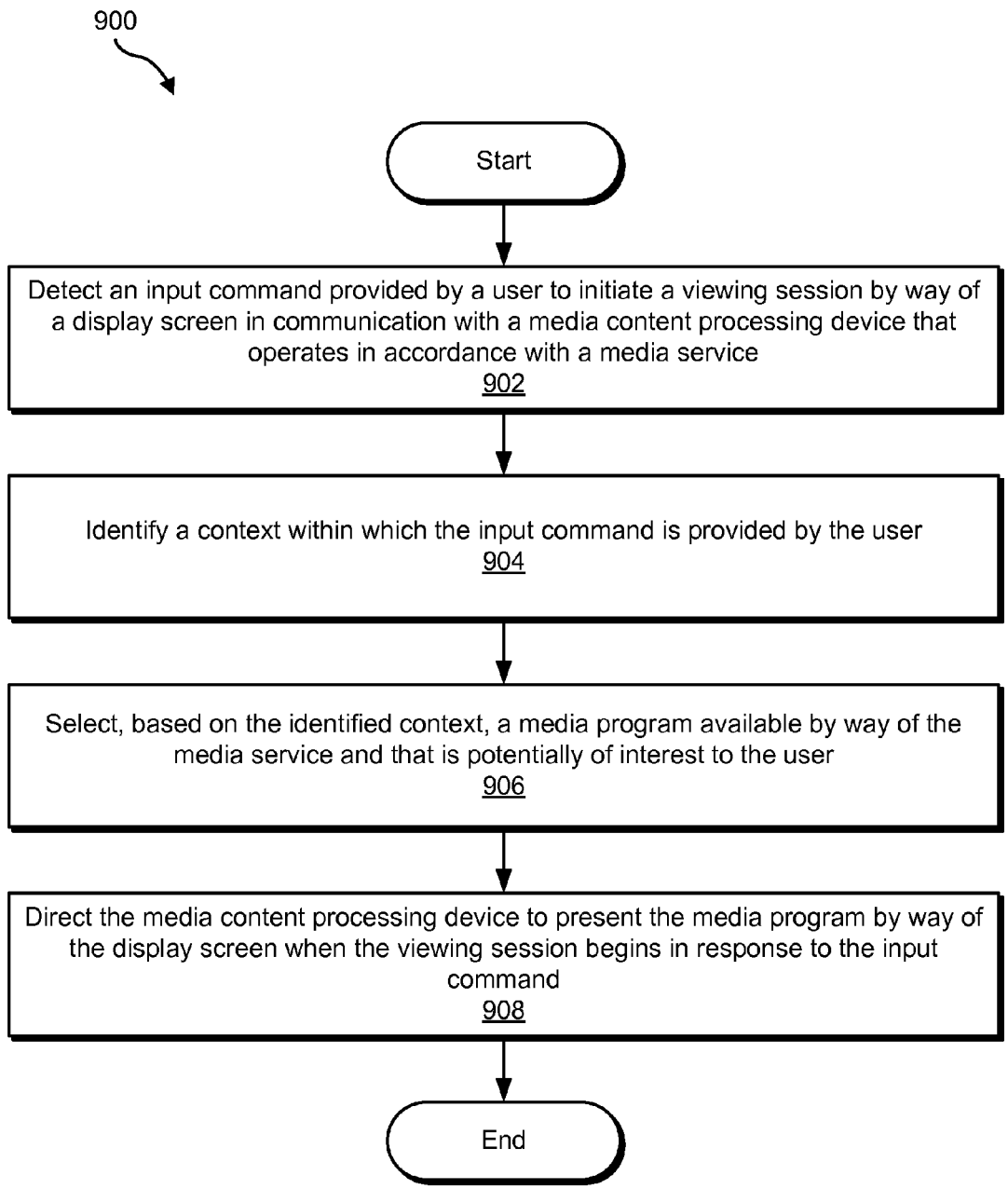
FIG. 9 illustrates an exemplary context-based media program presentation method according to principles described herein.

FIG. 9 illustrates an exemplary context-based media program presentation method 900. While FIG. 9 illustrates exemplary steps according to one embodiment, other embodiments may omit, add to, reorder, and/or modify any of the steps shown in FIG. 9. One or more of the steps shown in FIG. 9 may be performed by system 100 and/or any implementation thereof.

In step 902, a computer-implemented media service system detects an input command provided by a user to initiate a viewing session by way of a display screen in communication with a media content processing device that operates in accordance with a media service. Step 902 may be performed in any of the ways described herein.

In step 904, the computer-implemented media service system identifies a context within which the input command is provided by the user. Step 904 may be performed in any of the ways described herein.

In step 906, the computer-implemented media service system selects, based on the identified context, a media program available by way of the media service and that is potentially of interest to the user. Step 906 may be performed in any of the ways described herein.

In step 908, the computer-implemented media service system directs the media content processing device to present the media program by way of the display screen when the viewing session begins in response to the input command. Step 908 may be performed in any of the ways described herein.

Figure 10:
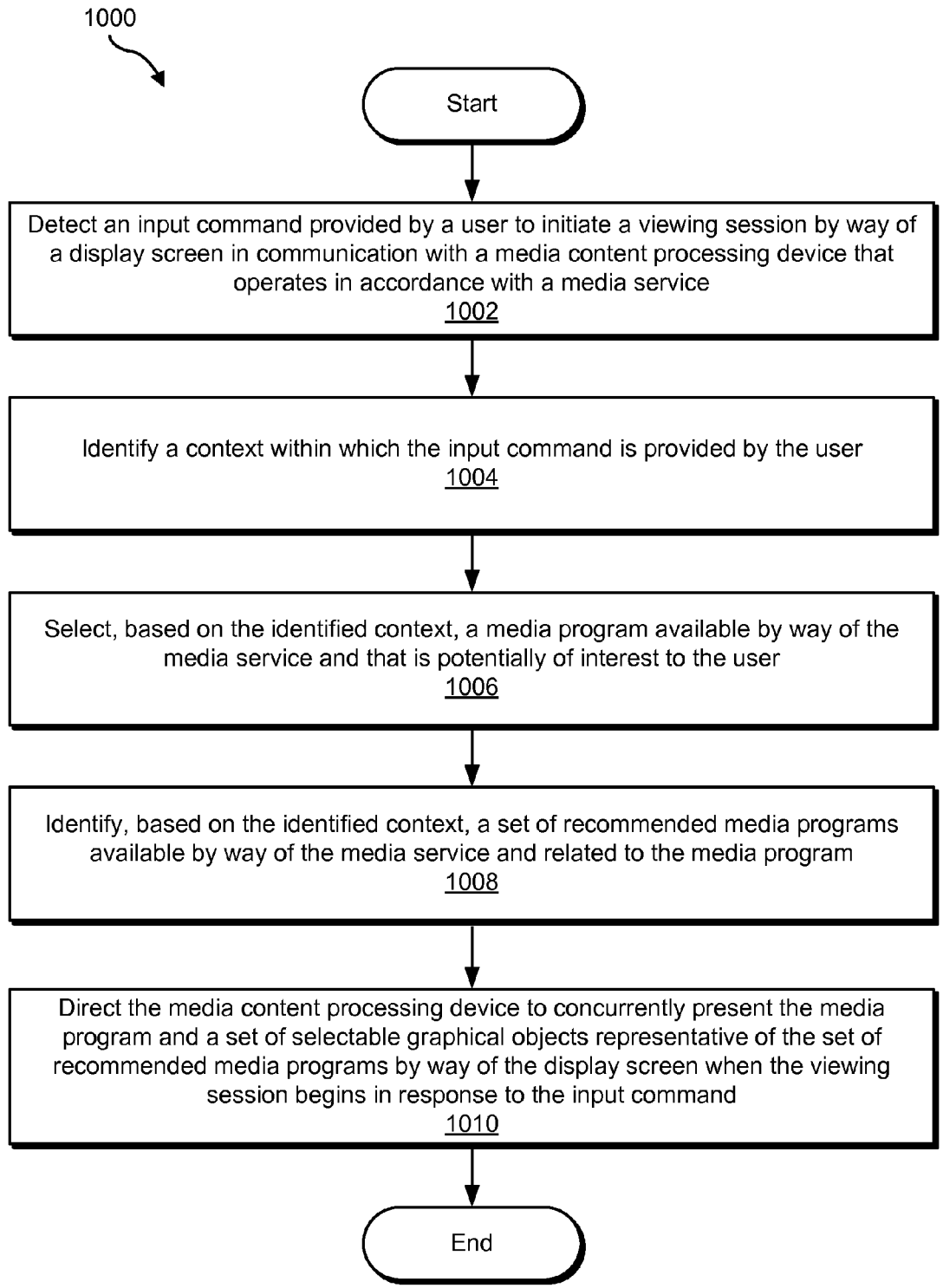
FIG. 10 illustrates another exemplary context-based media program presentation method according to principles described herein.

FIG. 10 illustrates another exemplary context-based media program presentation method 1000. While FIG. 10 illustrates exemplary steps according to one embodiment, other embodiments may omit, add to, reorder, and/or modify any of the steps shown in FIG. 10. One or more of the steps shown in FIG. 10 may be performed by system 100 and/or any implementation thereof.

In step 1002, a computer-implemented media service system detects an input command provided by a user to initiate a viewing session by way of a display screen in communication with a media content processing device that operates in accordance with a media service. Step 1002 may be performed in any of the ways described herein.

In step 1004, the computer-implemented media service system identifies a context within which the input command is provided by the user. Step 1004 may be performed in any of the ways described herein.

In step 1006, the computer-implemented media service system selects, based on the identified context, a media program available by way of the media service and that is potentially of interest to the user. Step 1006 may be performed in any of the ways described herein.

In step 1008, the computer-implemented media service system identifies, based on the identified context, a set of recommended media programs available by way of the media service and related to the media program. Step 1008 may be performed in any of the ways described herein.

In step 1010, the computer-implemented media service system directs the media content processing device to concurrently present the media program and a set of selectable graphical objects representative of the set of recommended media programs by way of the display screen when the viewing session begins in response to the input command. Step 1010 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
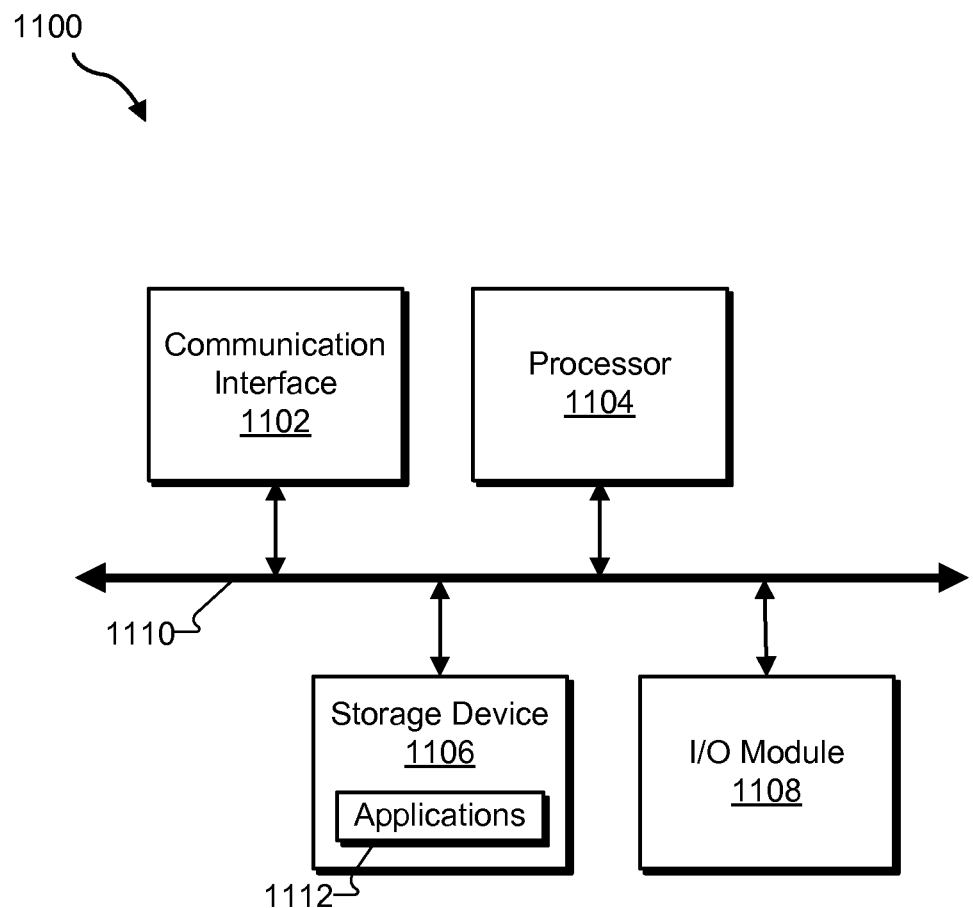
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102 and content management facility 104. Likewise, storage facility 106 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a computer-implemented media service system, an input command provided by a user to initiate a viewing session by way of a display screen in communication with a media content processing device that operates in accordance with a media service;
    identifying, by the computer-implemented media service system, a context within which the input command is provided by the user;
    selecting, by the computer-implemented media service system based on the identified context, a media program available by way of the media service and that is potentially of interest to the user;
    directing, by the computer-implemented media service system, the media content processing device to present the media program by way of the display screen when the viewing session begins in response to the input command;
    detecting, by the computer-implemented media service system while the media content processing device is presenting the media program by way of the display screen, that an additional user enters a vicinity of the display screen;
    determining, by the computer-implemented media service system in response to the detecting that the additional user enters the vicinity of the display screen, whether the user has left the vicinity of the display screen; and
    if the determining indicates that the user has left the vicinity of the display screen
        selecting, by the computer-implemented media service system, an additional media program available by way of the media service and that is potentially of interest to the additional user, and
        automatically directing, by the computer-implemented media service system without receiving input from the additional user, the media content processing device to switch from presenting the media program by way of the display screen to presenting the additional media program by way of the display screen.

2. The method of claim 1, wherein the context within which the input command is provided by the user comprises a temporal context that indicates at least one of a time of day that the input command is provided by the user, a week day during which the input command is provided by the user, and a calendar date during which the input command is provided by the user.

3. The method of claim 2, wherein the selecting, based on the identified context, of the media program available by way of the media service and that is potentially of interest to the user comprises:
    using the temporal context to identify a particular media program available by way of the media service and that is related to one or more media programs that the media content processing device historically presents by way of the display device during at least one of the time of day, the week day, and the calendar date; and
    designating the particular media program as the media program that is selected as being potentially of interest to the user.

4. The method of claim 1, wherein the context within which the input command is provided by the user comprises a user context that indicates an identity of the user.

5. The method of claim 4, wherein the selecting, based on the identified context, of the media program available by way of the media service and that is potentially of interest to the user comprises:
    using the identity of the user to identify a user profile linked to the user and associated with at least one of the media content processing device and the media service;
    identifying a particular media program available by way of the media service and that has one or more attributes that the user profile indicates are of interest to the user; and
    designating the particular media program as the media program that is selected as being potentially of interest to the user.

6. The method of claim 1, wherein the context within which the input command is provided by the user comprises a user context that indicates a user account that is currently logged in to at least one of the media content processing device and the media service when the input command is provided by the user.

7. The method of claim 1, wherein:
    the directing of the media content processing device to present the media program comprises directing the media content processing device to tune to a content channel carrying the media program; and
    the media content processing device is initially tuned to a different content channel when the input command is provided by the user to initiate the viewing session.

8. The method of claim 1, further comprising directing, by the computer-implemented media service system, the media content processing device to present, by way of the display screen and concurrently with the media program, a set of selectable graphical objects representative of a set of features associated with the media service.

9. The method of claim 8, wherein the set of features comprises a set of recommended media programs available by way of the media service, and wherein each graphical object included in the set of selectable graphical objects represents a particular recommended media program included in the set of recommended media programs.

10. The method of claim 9, further comprising determining, by the computer-implemented media service system, a relative position of each graphical object included in the set of selectable graphical objects based on a degree of relatedness of each recommended media program included in the set of recommended media programs to the media program.

11. The method of claim 9, further comprising identifying, by the computer-implemented media service system prior to directing the media content processing device to present the set of selectable graphical objects, the recommended media programs based on a context within which the set of graphical objects is to be presented.

12. The method of claim 1, embodied as computer-executable instructions on at least one non-transitory computer-readable medium.

13. A method comprising:
    detecting, by a computer-implemented media service system, an input command provided by a user to initiate a viewing session by way of a display screen in communication with a media content processing device that operates in accordance with a media service;
    identifying, by the computer-implemented media service system, a context within which the input command is provided by the user;
    selecting, by the computer-implemented media service system based on the identified context, a media program available by way of the media service and that is potentially of interest to the user;
    identifying, by the computer-implemented media service system based on the identified context, a set of recommended media programs available by way of the media service and related to the media program;
    directing, by the computer-implemented media service system, the media content processing device to concurrently present the media program and a set of selectable graphical objects representative of the set of recommended media programs by way of the display screen when the viewing session begins in response to the input command;
    detecting, by the computer-implemented media service system while the media content processing device is presenting the media program by way of the display screen, that an additional user enters a vicinity of the display screen;
    determining, by the computer-implemented media service system in response to the detecting that the additional user enters the vicinity of the display screen, whether the user has left the vicinity of the display screen; and
    if the determining indicates that the user has left the vicinity of the display screen
        selecting, by the computer-implemented media service system, an additional media program available by way of the media service and that is potentially of interest to the additional user, and
        automatically directing, by the computer-implemented media service system without receiving input from the additional user, the media content processing device to switch from presenting the media program by way of the display screen to presenting the additional media program by way of the display screen.

14. The method of claim 13, embodied as computer-executable instructions on at least one non-transitory computer-readable medium.

15. A system comprising:
    at least one physical computing device that:
        detects an input command provided by a user to initiate a viewing session by way of a display screen in communication with a media content processing device that operates in accordance with a media service,
        identifies a context within which the input command is provided by the user,
        selects, based on the identified context, a media program available by way of the media service and that is potentially of interest to the user,
        directs the media content processing device to present the media program by way of the display screen when the viewing session begins in response to the input command;
        detects, while the media content processing device is presenting the media program by way of the display screen, that an additional user enters a vicinity of the display screen;
        determines, in response to the detection of the additional user entering the vicinity of the display screen, whether the user has left the vicinity of the display screen; and
        if the determination indicates that the user has left the vicinity of the display screen
            selects an additional media program available by way of the media service and that is potentially of interest to the additional user, and
            automatically directs, without receiving input from the additional user, the media content processing device to switch from presenting the media program by way of the display screen to presenting the additional media program by way of the display screen.

16. The system of claim 15, wherein the at least one physical computing device directs the media content processing device to present, by way of the display screen and concurrently with the media program, a set of selectable graphical objects representative of a set of features associated with the media service.

17. The system of claim 16, wherein the set of features comprises a set of recommended media programs available by way of the media service, and wherein each graphical object included in the set of selectable graphical objects represents a particular recommended media program included in the set of recommended media programs.

18. The system of claim 17, wherein the at least one physical computing device determines a relative position of each graphical object included in the set of selectable graphical objects based on a degree of relatedness of each recommended media program included in the set of recommended media programs to the media program.

19. The system of claim 17, wherein the at least one physical computing device identifies, prior to directing the media content processing device to present the set of selectable graphical objects, the recommended media programs based on a context within which the set of graphical objects is to be presented.

20. The method of claim 1, further comprising:
    if the determining indicates that the user has not left the vicinity of the display screen
        selecting, by the computer-implemented media service system, another additional media program available by way of the media service and that is potentially of interest both to the user and to the additional user, presenting, by the computer-implemented media service system to the user and the additional user, a notification of an availability of the other additional media program along with a selectable option for the media content processing device to switch from presenting the media program by way of the display screen to presenting the other additional media program by way of the display screen, and directing, by the computer-implemented media service system based on a user selection of the selectable option, the media content processing device to switch from presenting the media program by way of the display screen to presenting the other additional media program by way of the display screen.

\* \* \* \* \*